(12) United States Patent
Ito et al.

(10) Patent No.: US 12,084,835 B2
(45) Date of Patent: Sep. 10, 2024

(54) REMOTE OPERATION DEVICE AND REMOTE OPERATION SYSTEM

(71) Applicants: KOBELCO CONSTRUCTION MACHINERY CO., LTD., Hiroshima (JP); HIROSHIMA UNIVERSITY, Higashihiroshima (JP)

(72) Inventors: Masaru Ito, Higashihiroshima (JP); Yuichi Kurita, Higashihiroshima (JP)

(73) Assignees: Kobelco Construction Machinery Co., Ltd., Hiroshima (JP); Hiroshima University, Hiroshima (JP)

( * ) Notice: Subject to any disclaimer, the term of this patent is extended or adjusted under 35 U.S.C. 154(b) by 298 days.

(21) Appl. No.: 17/782,756

(22) PCT Filed: Nov. 30, 2020

(86) PCT No.: PCT/JP2020/044543
§ 371 (c)(1),
(2) Date: Jun. 6, 2022

(87) PCT Pub. No.: WO2021/124858
PCT Pub. Date: Jun. 24, 2021

(65) Prior Publication Data
US 2023/0003002 A1    Jan. 5, 2023

(30) Foreign Application Priority Data

Dec. 19, 2019 (JP) .................................. 2019-229564
Aug. 26, 2020 (JP) .................................. 2020-142502

(51) Int. Cl.
*E02F 9/20* (2006.01)
*E02F 9/26* (2006.01)

(52) U.S. Cl.
CPC .............. *E02F 9/205* (2013.01); *E02F 9/264* (2013.01)

(58) Field of Classification Search
None
See application file for complete search history.

(56) References Cited

U.S. PATENT DOCUMENTS

2010/0249957 A1* 9/2010 Price ...................... G08C 17/02
700/83
2018/0051446 A1* 2/2018 Yoshinada .............. E02F 9/264
(Continued)

FOREIGN PATENT DOCUMENTS

CA       3 052 129 A1    3/2019
JP       2013-168778 A    8/2013
(Continued)

OTHER PUBLICATIONS

The extended European search report dated Dec. 12, 2022 issued in the corresponding EP Patent Application No. 20901434.9.

*Primary Examiner* — Thomas E Worden
(74) *Attorney, Agent, or Firm* — Carrier, Shende & Associates P.C.; Joseph P. Carrier; Fulchand P. Shende

(57) ABSTRACT

A remote operation device and a remote operation system that can reduce or eliminate deviation of the position of an indicator image of a working unit such as a line image in an image with respect to the position of the working unit in a real space. In some case, because of a cause such as a communication failure, a position posture coordinate value of a working unit corresponding to captured image data in a work environment image deviates from a position posture coordinate value of the working unit estimated according to an operation form of a remote operation mechanism. In this case, a semitransparent indicator image $Img2(\tau2)$ simulating a bucket is superimposed on a work environment image $Img1(\tau2)$ in a position where the bucket is estimated to be originally present and deviating from an image region representing the bucket.

10 Claims, 9 Drawing Sheets

(56) References Cited

U.S. PATENT DOCUMENTS

| | | | | |
|---|---|---|---|---|
| 2019/0024348 A1* | 1/2019 | Hiekata | ............... | E02F 9/267 |
| 2020/0125114 A1* | 4/2020 | Minagawa | ........... | G05D 1/0282 |
| 2020/0399861 A1* | 12/2020 | Ito | ..................... | H04N 7/18 |
| 2021/0010244 A1* | 1/2021 | Ito | ..................... | G02B 27/0172 |
| 2022/0064908 A1* | 3/2022 | Hama | ................ | E02F 9/264 |
| 2022/0406211 A1* | 12/2022 | Otani | ................ | E02F 9/264 |
| 2023/0023778 A1* | 1/2023 | Sasaki | ................ | E02F 9/2054 |
| 2023/0073325 A1* | 3/2023 | Sasaki | ................ | G05D 1/0038 |
| 2023/0128501 A1* | 4/2023 | Morita | ................ | E02F 9/205 701/50 |
| 2023/0228064 A1* | 7/2023 | Ito | ..................... | E02F 9/205 701/2 |
| 2024/0112459 A1* | 4/2024 | Hoso | ................ | G01B 11/002 |

FOREIGN PATENT DOCUMENTS

| | | | |
|---|---|---|---|
| JP | 5919022 B2 | 5/2016 | |
| JP | 2017-022433 A | 1/2017 | |
| JP | 2019-068254 A | 4/2019 | |
| JP | 2019-190163 A | 10/2019 | |

\* cited by examiner

REMOTE OPERATION DEVICE AND REMOTE OPERATION SYSTEM

TECHNICAL FIELD

The present invention relates to a device for remotely operating a working machine.

BACKGROUND ART

There has been proposed a technique for avoiding deterioration in work efficiency due to occurrence of an image delay in display of a monitor in a remote operation system for wirelessly remote operation, with a controller provided in an operation seat, a working machine including a working unit (see, for example, Patent Literature 1). Specifically, a line image of the working unit is created in a position corresponding to the working unit in a photographed video of a camera provided in the working machine. The line image is wirelessly transmitted and displayed on the monitor to be superimposed on the photographed video of the camera. Accordingly, a line image with a small time lag due to the transmission is used. The working unit is displayed in a position close to an actual position. Consequently, even if an image delay occurs in the display of the monitor, an operator can perform operation of the working unit while complementing the image delay of the monitor based on the line image displayed on the monitor.

CITATION LIST

Patent Literature

Patent Literature 1: Japanese Patent No. 5919022

SUMMARY OF INVENTION

Technical Problem

However, since means for creating a line image is mounted on the working machine, when a failure occurs in the transmission of the line image, it is likely that the line image superimposed on the photographed video of the camera temporarily disappears or deviation of the position of the line image with respect to the actual position of the working unit increases.

Therefore, an object of the present invention is to provide a remote operation device and a remote operation system that can reduce or eliminate deviation of the position of an indicator image of a working unit such as a line image in an image with respect to the position of the working unit in a real space.

Solution to Problem

A remote operation device of the present invention is a remote operation device for remotely operating a working machine including a working mechanism, the remote operation device including:

remote wireless communication equipment having a communication function with real machine wireless communication equipment mounted on the working machine;

a remote image output device;

a remote operation mechanism;

a remote control element that recognizes an operation form of the remote operation mechanism by an operator and causes the remote wireless communication equipment to transmit a command signal corresponding to the operation form to the real machine wireless communication equipment;

a first output control element that causes the remote image output device to output a work environment image including a working unit of the working mechanism acquired through an imaging device mounted on the working machine, transmitted from the real machine wireless communication equipment, and received by the remote wireless communication equipment; and a second output control element that estimates, based on an operation form of the remote operation mechanism at a first point in time recognized by the remote control element, a space occupying form of the working unit at a second point in time later than the first point in time, superimposes, on the work environment image, at a third point in time included in a period from the first point in time to the second point in time, an indicator image representing the estimated space occupying form of the working unit at the second point in time without spoiling visibility of the working unit, and causes the remote image output device to output the indicator image.

A remote operation system of the present invention is configured by the remote operation device of the present invention and the working machine.

DESCRIPTION OF EMBODIMENT (Configuration of a Remote Operation System)

Figure 1:
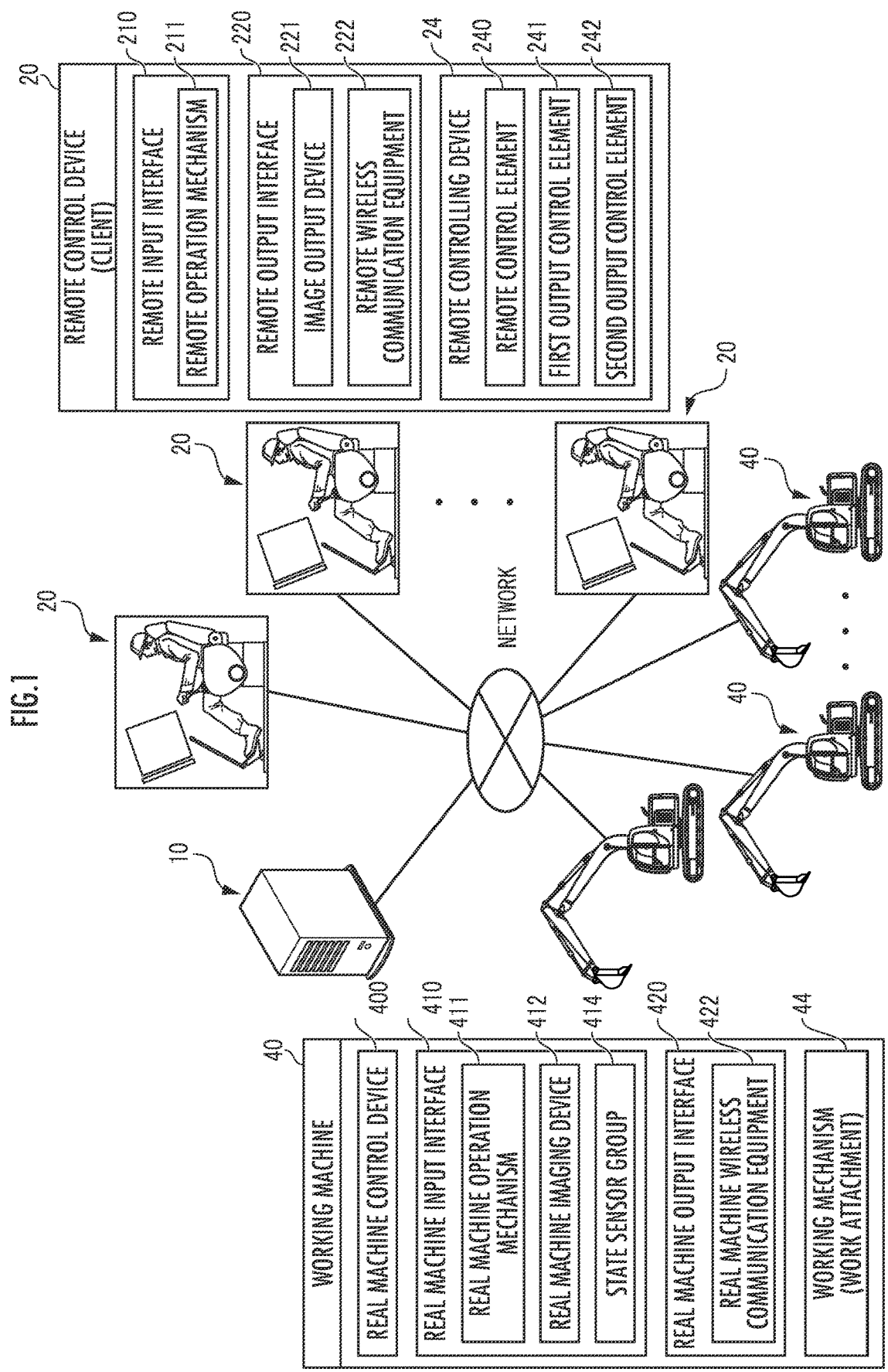
FIG. 1 is an explanatory diagram concerning a configuration of a remote operation system according to an embodiment of the present invention.

A remote operation system according to an embodiment of the present invention shown in FIG. 1 is configured by a remote operation device 20 and a working machine 40, which is a remote operation target by the remote operation device 20. The remote operation device 20 and the working machine 40 are configured to be capable of performing network communication with each other. A server 10 may be interposed in mutual communication of the remote operation device 20 and the working machine 40. The server 10 may configure a part of the remote operation system.

(Configuration of the Remote Operation Device)

The remote operation device 20 includes a remote input interface 210, a remote output interface 220, and a remote control device 24. The remote input interface 210 includes a remote operation mechanism 211. The remote output interface 220 includes an image output device 221 and remote wireless communication equipment 222. The remote control device 24 includes a remote control element 240, a first output control element 241, and a second output control element 242. The elements are configured by an arithmetic processing device (a single core processor or a multi-core processor or a processor core configuring the single processor core or the multi-core processor), read necessary data and software from a storage device such as a memory, and execute arithmetic processing according to the software targeting the data The remote control element 240 recognizes an operation form of the remote operation mechanism 211 by an operator and causes the remote wireless communication equipment 222 to transmit a command signal corresponding to the operation form to real machine wireless communication equipment 422. The first output control element 241 causes the image output device 221 to output a work environment image Img1 including a bucket 445 (=a working unit) of a work attachment 44 (=a working mechanism) acquired through a real machine imaging device 412 mounted on the working machine 40, transmitted from the real machine wireless communication equipment 422, and received by the remote wireless communication equipment 222. The second output control element 242 estimates, based on an operation form of the remote operation mechanism 211 at a first point in time t=t1 recognized by the remote control element 240, a space occupying form of the bucket 445 at a second point in time t=t2 later than the first point in time. The second output control element 242 superimposes, on a work environment image Img1(t3), at a third point in time t=t3, an indicator image Img2(t2) representing the estimated space occupying form of the bucket 445 without spoiling visibility of the working unit (the bucket 445) and causes the image output device 221 to output the indicator image Img2(t2).

An operation device for traveling, an operation device for turning, an operation device for boom, an operation device for arm, and an operation device for bucket are included in the remote operation mechanism 211. The operation devices include operation levers that receive turning operation. The operation lever (a traveling lever) of the operation device for traveling is operated to move a lower traveling body 41 of the working machine 40. The traveling lever may function as a traveling pedal. For example, a traveling pedal fixed to a base or a lower end portion of the traveling lever may be provided. The operation lever (a turning lever) of the operation device for turning is operated to move a hydraulic turning motor configuring a turning mechanism 43 of the working machine 40. The operation lever (a boom lever) of the operation device for boom is operated to move a boom cylinder 442 of the working machine 40. The operation lever (an arm lever) of the operation device for arm is operated to move an arm cylinder 444 of the working machine 40. The operation lever (a bucket lever) of the operation device for bucket is operated to move a bucket cylinder 446 of the working machine 40. The remote operation mechanism 211 has the same configuration as the configuration of the real machine operation mechanism 411 mounted on the working machine 40 but may be an operation mechanism having a configuration different from the configuration of the real machine operation mechanism 411 such as a touch panel-type or a button-type operation mechanism to which an operation command is input.

Figure 2:
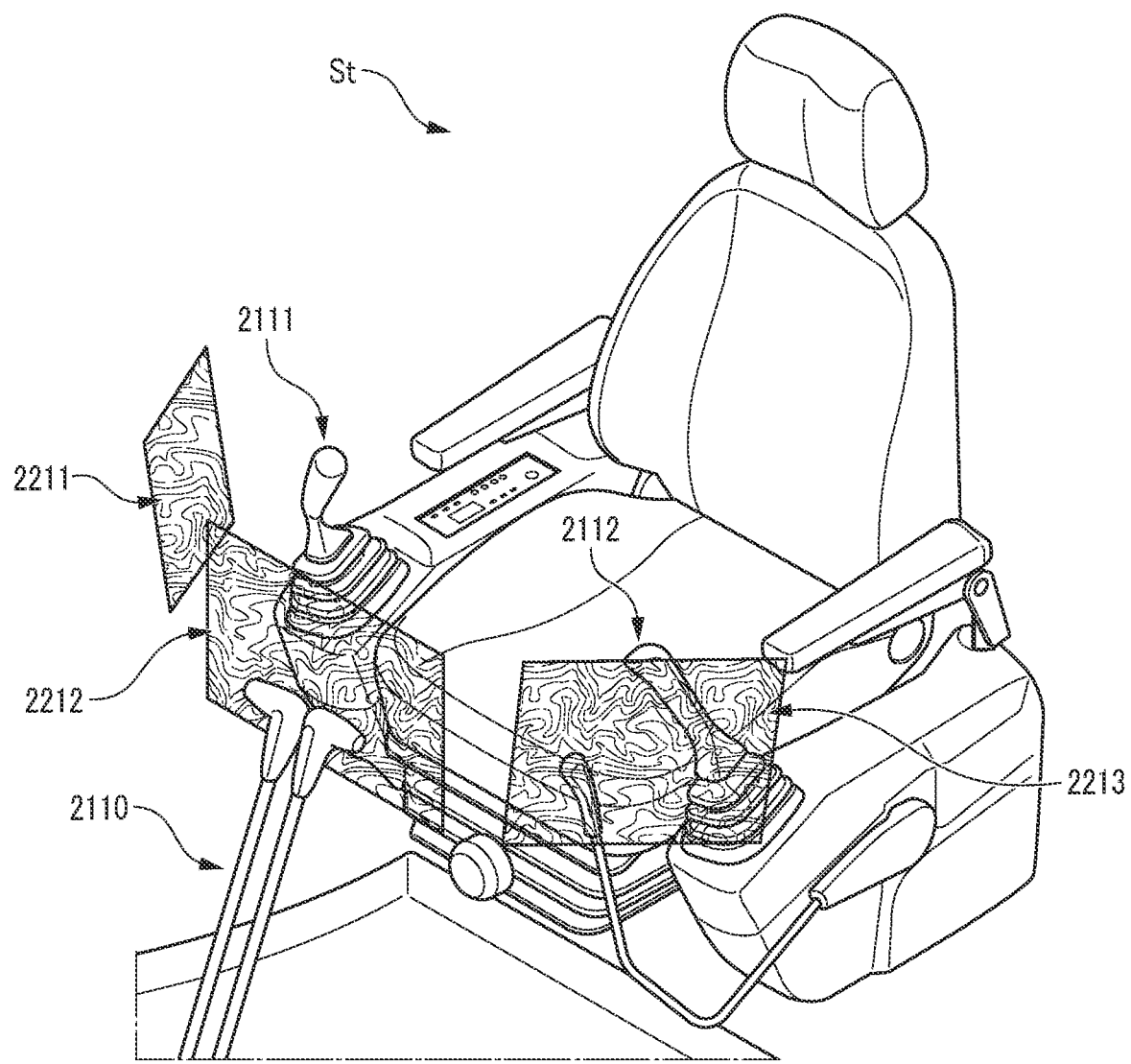
FIG. 2 is an explanatory diagram concerning a configuration of a remote operation device.

The operation levers configuring the remote operation mechanism 211 are disposed around a seat St for seating the operator, for example, as shown in FIG. 2. The seat St has a form like a high-back chair attached with armrests but may have any form on which a remote operator can be seated such as a form like a low-back chair without a headrest or a form like a chair without a backrest.

A pair of left and right traveling levers 2110 corresponding to left and right crawlers are disposed side by side on the left and the right in the front of the seat St. One operation lever may function as a plurality of operation levers. For example, a right-side operation lever 2111 provided in the front of a right-side frame of the seat St shown in FIG. 2 may function as a boom lever when being operated in the front-rear direction and function as a bucket lever when being operated in the left-right direction. Similarly, a left-side operation lever 2112 provided in the front of a left-side frame of the seat St shown in FIG. 2 may function as an arm lever when being operated in the front-rear direction and function as a turning lever when being operated in the left-right direction. A lever pattern may be optionally changed according to an operation instruction of the operator.

The image output device 221 is configured by, for example, as shown in FIG. 2, a right oblique front image output device 2211, a front image output device 2212, and a left oblique front image output device 2213 respectively disposed in the right oblique front, the front, and the left oblique front of the seat St. The image output devices 2211 to 2213 may further include speakers (sound output devices).

(Configuration of the Working Machine)

The working machine 40 includes a real machine control device 400, a real machine input interface 410, a real machine output interface 420, and a work attachment 44. The real machine control device 400 is configured by an arithmetic processing device (a single core processor or a multi-core processor or a processor core configuring the single core processor or the multi-core processor) and reads necessary data and software from a storage device such as a memory and executes arithmetic processing conforming to the software targeting the data.

Figure 3:
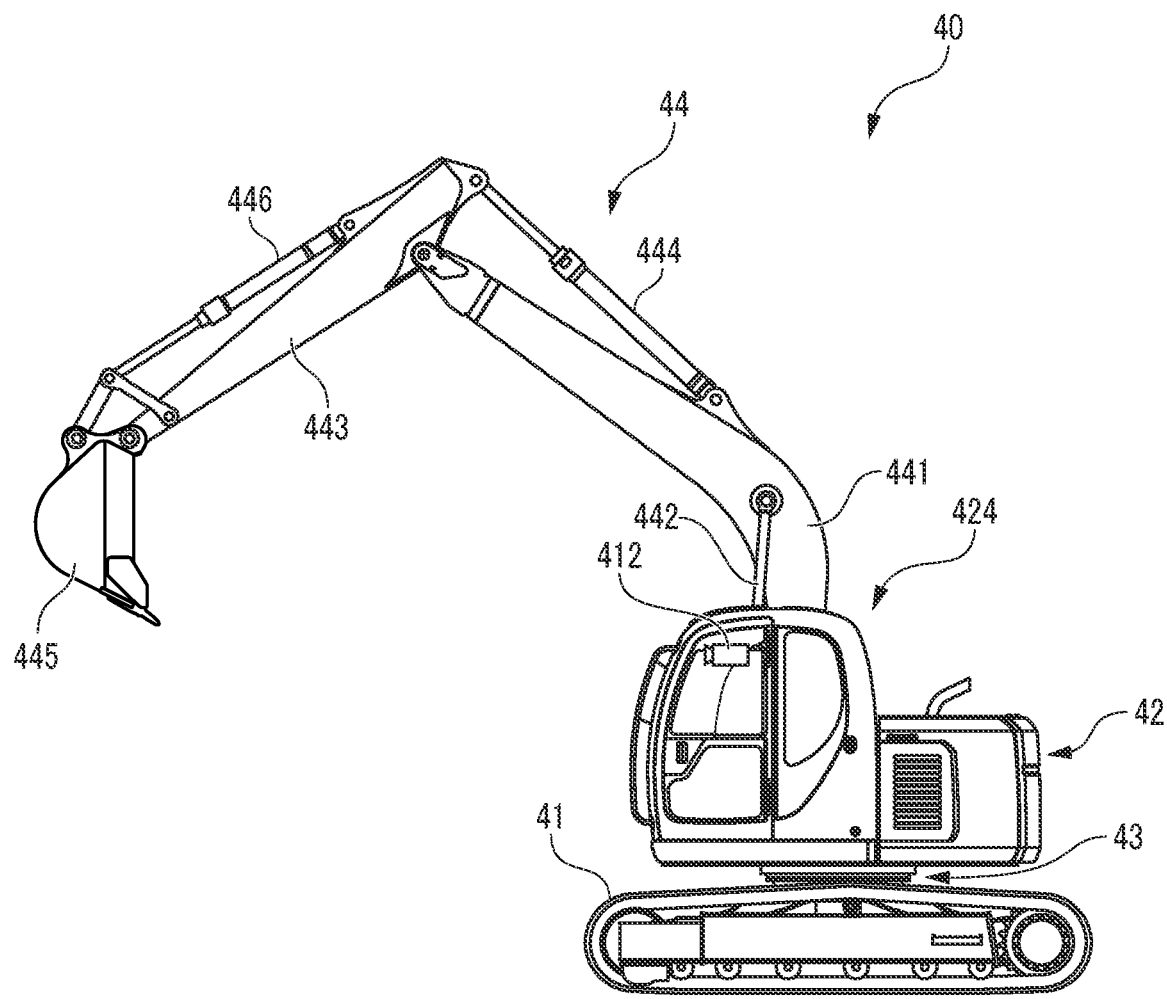
FIG. 3 is an explanatory diagram concerning a configuration of a working machine

The working machine 40 is, for example, a crawler shovel (a construction machine) and includes, as shown in FIG. 3, a crawler-type lower traveling body 41 and an upper turning body 42 turnably mounted on the lower traveling body 41 via the turning mechanism 43. The turning mechanism 43 corresponds to one of working mechanisms. A cab (an operator's cab) 424 is provided in a front left side portion of the upper turning body 42. The work attachment 44 is provided in the front center of the upper turning body 42.

The real machine input interface 410 includes a real machine operation mechanism 411, a real machine imaging device 412, and a state sensor group 414. The real machine operation mechanism 411 includes a plurality of operation levers disposed around a seat disposed on the inside of the cab 424 like the operation levers of the remote operation mechanism 211. A driving mechanism or a robot that receives a signal corresponding to an operation form of a remote operation lever and moves a real machine operation lever based on the received signal is provided in the cab 424. An operating form of the working machine 40 may be controlled by not moving the real machine operation lever but by controlling an opening degree or the like of a valve configuring a hydraulic circuit. The real machine imaging device 412 is set, for example, on the inside of the cab 424 and images an environment including at least a part of the work attachment 44 through a front window of the cab 424. The state sensor group 414 is configured by various sensors that output signals representing operating forms or operating states of the working mechanisms such as a relative posture angle of the upper turning body 42 with respect to the lower traveling body 41, a relative posture angle of a boom 441 with respect to the upper turning body 42, a relative posture angle of an arm 443 with respect to the boom 441, and a relative posture angle of the bucket 445 with respect to the arm 443.

The real machine output interface 420 includes the real machine wireless communication equipment 422.

The work attachment 44 functioning as one of the working mechanisms includes the boom 441 attached to the upper turning body 42 to be capable of raising and lowering, the arm 443 turnably coupled to the distal end of the boom 441, and the bucket 445 functioning as the working unit turnably coupled to the distal end of the arm 443. A boom cylinder 442, an arm cylinder 444, and a bucket cylinder 446 configured by extendable hydraulic cylinders are attached to the work attachment 44.

The boom cylinder 442 is interposed between the boom 441 and the upper turning body 42 to extend and contract and turn the boom 441 in a rising and lowering direction by receiving supply of hydraulic oil. The arm cylinder 444 is interposed between the arm 443 and the boom 441 to extend and contract and turn the arm 443 around the horizontal axis with respect to the boom 441 by receiving supply of hydraulic oil. The bucket cylinder 446 is interposed between the bucket 445 and the arm 443 to extend and contract and turn the bucket 445 around the horizontal axis with respect to the arm 443 by receiving supply of hydraulic oil.

(Function)

A function of the remote operation system having the configuration explained above is explained with reference to a flowchart shown in FIG. 4. In the flowchart, a block "C" is used for simplification of description and means transmission and/or reception of data and means a conditional branch for executing processing in a branching direction on condition that the data is transmitted and/or received.

Figure 4:
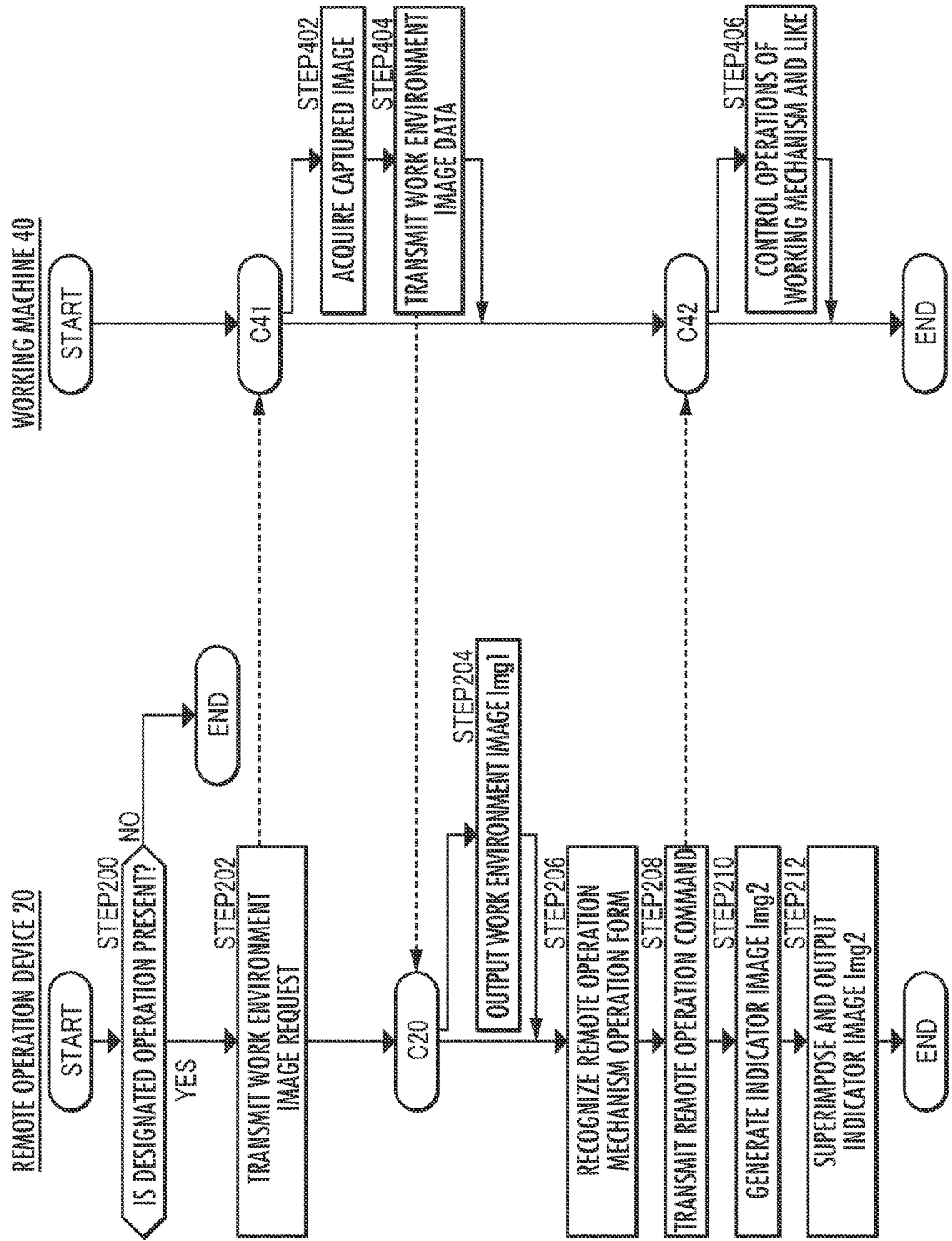
FIG. 4 is an explanatory diagram concerning a function of the remote operation system.

In the remote operation device 20, presence or absence of designated operation through the remote input interface 210 by the operator is determined (FIG. 4/STEP 200). The "designated operation" is, for example, touch operation such as tap, swipe, flick, or pinch out/in on a touch panel configuring the remote input interface 210. When a result of the determination is negative (FIG. 4/STEP 200 . . . NO), a series of processing ends. On the other hand, when the determination result is affirmative (FIG. 4/STEP 200 . . . YES), a work environment image request is transmitted through the remote wireless communication equipment 222 by the first output control element 241 (FIG. 4/STEP 202). At least one of an identifier of the remote operation device 20 and an identifier of the operator is included in the work environment image request.

In the working machine 40, when the work environment image request is received through the real machine wireless communication equipment 422 (FIG. 4/C41), the real machine control device 400 acquires a captured image through the real machine imaging device 412 (FIG. 4/S STEP 402). Captured image data representing the captured image is transmitted to the remote operation device 20 by the real machine control device 400 through the real machine wireless communication equipment 422 (FIG. 4/STEP 404). The captured image may be acquired through an imaging device set on a work site or the outside of the working machine 40.

Figure 7:
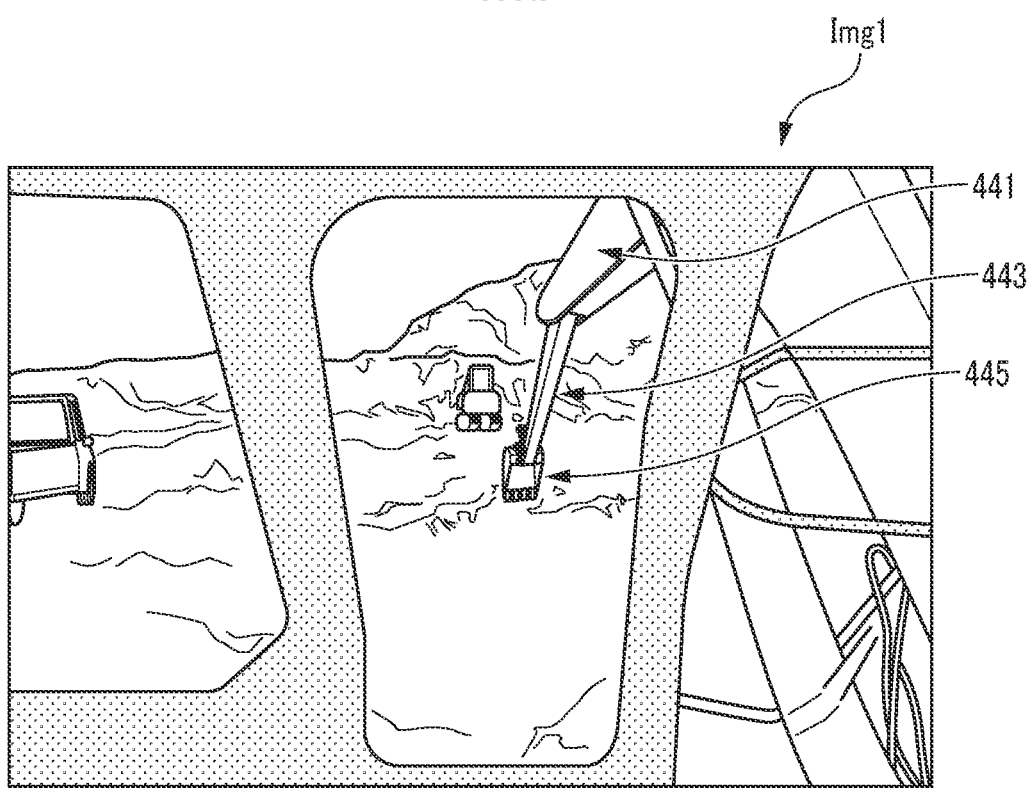
FIG. 7 is an explanatory diagram concerning a work environment image.

In the remote operation device 20, when captured image data is received through the remote wireless communication equipment 222 (FIG. 4/C20), a work environment image corresponding to the captured image data is output to the image output device 221 (FIG. 4/STEP 204). The work environment image is an entire or a part of a captured image itself or a simulative work environment image generated based on an entire or a part of a captured image itself. Consequently, for example, as shown in FIG. 7, the work environment image Img1 in which the boom 441, the arm 443, and the bucket 445, which are parts of the work attachment 44 functioning as the working mechanism, are imaged is displayed on the image output device 221 in time series.

In the remote operation device 20, an operation form of the remote operation mechanism 211 is recognized by the remote control element 240 (FIG. 4/STEP 206) and a remote operation command signal corresponding to the operation form is transmitted to the working machine 40 through the remote wireless communication equipment 222 (FIG. 4/STEP 208).

In the working machine 40, when an operation command is received by the real machine control device 400 through the real machine wireless communication equipment 422 (FIG. 4/C42), operations of the work attachment 44 and the like are controlled (FIG. 4/STEP 406). For example, work for scooping soil in the front of the working machine 40 with the bucket 445 and turning the upper turning body 42 and, then, dropping the soil from the bucket 445 is executed.

In the remote operation device 20, based on an operation form of the remote operation mechanism 211 at a first point in time recognized by the remote control element 240, a space occupying form at the first point in time t=t1 or a second point in time t=t2 later than the first point in time of the working unit (the bucket 445) of the work attachment 44 is estimated (or predicted) by the second output control element 242 and an indicator image Img2 representing the space occupying form of the working unit is generated (FIG. 4/STEP 210). Specifically, based on positions or inclination angles of the operation levers configuring the remote operation mechanism 211, each of a relative posture angle of the upper turning body 42 with respect to the lower traveling body 41, a relative posture angle of the boom 441 with respect to the upper turning body 42, a relative posture angle of the arm 443 with respect to the boom 441, and a relative posture angle of the bucket 445 with respect to the arm 443 is estimated as a real machine operating form. A space occupying form in a real machine coordinate system (a coordinate system in which a position and a posture are fixed with respect to the working machine 40) of the bucket 445 (the working unit) is estimated based on a result of the estimation. According to a coordinate conversion matrix (a rotation matrix or a combination of the rotation matrix and a translation matrix) corresponding to a position and a posture of the real machine imaging device 412 in the real machine coordinate system, a coordinate value representing the space occupying form of the working unit in the real machine coordinate system is converted into a coordinate value representing an estimated space occupying form of the working unit in a work environment image coordinate system or an estimated extension form of an image region where the bucket 445 is present.

In addition to or instead of the space occupying form of the bucket 445, a space occupying form of at least one of the arm 443 and the boom 441 or the like may be recognized as the space occupying form of the working unit.

When the space occupying form of the working unit at the second point in time t=t2 is estimated, a part or all of a first communication delay time TTD1, a first response delay time TRD1, a second communication delay time TTD2, and a second response delay time TRD2 are taken into account. The "first communication delay time TTD1" is a communication delay time from when a command signal corresponding to an operation form of the remote operation mechanism 211 is transmitted from the remote wireless communication equipment 222 until when the command signal is received by the real machine wireless communication equipment 422. The "first response delay time TRD1" is a response delay time from when the command signal is received by the real machine wireless communication equipment 422 until when the operation of the working machine 40 is controlled by the real machine control device 400 according to the command signal (the command signal is reflected on the operation of the working machine 40). The "second communication delay time TTD2" is a communication delay time from when captured image data (environment image data) is transmitted from the real machine wireless communication equipment 422 until when the captured image data is received by the remote wireless communication equipment 222. The "second response delay time TRD2" is a response delay time from when the environment image data is received by the remote wireless communication equipment 222 until when an environment image is output to the image output device 221 according to the environment image data In a situation in which the operator is operating the remote operation mechanism 211, a position posture of the working unit projected on the image output device 221 at a certain point in time t=t represents a real space position posture of the working unit at a point in time t=t−(TTD2+TRD2) preceding by a second delay time (a total time of the second communication delay time TTD2 and the second response delay time TRD2). The real space position posture of the working unit at the preceding point in time t=t−(TTD2+TRD2) corresponds to an operation form of the remote operation mechanism 211 at a point in time t=t−(TTD2+TRD2)−(TTD1+TRD1) further preceding by a first delay time (a total time of the first communication delay time TTD1 and the first response delay time TRD1). Accordingly, based on the operation form of the remote operation mechanism 211 at the first point in time t=t1, a space occupying form of the working unit at the second point in time t=t2, which is a point in time later than the first point in time by TTD1+TRD1+TTD2+TRD2 is estimated or predicted.

However, when a delay time is negligibly small, a space occupying form of the working unit at the second point in time t=t2 may be estimated or predicted without the delay time being taken into account. For example, the first communication delay time TTD1 and the second communication delay time TTD2 are negligibly small because of a further increase in communication speed, a space occupying form of the working unit at the second point in time t=t2, which is a point in time later than the first point in time t=t1 by TRD1 or TRD1+TRD2, may be estimated or predicted. When the first response delay time TRD1 and the second response delay time TRD2 are negligibly small, a space occupying form of the working unit at the second point in time t=t2, which is the same point in time as the first point in time t=t1 or substantially the same point in time later than the first point in time t=t1, may be estimated or predicted.

The indicator image Img2 is, for example, a semitransparent image. An edge point group is detected in a work environment image Img1(t), an image region equivalent to the working unit (the bucket 445) is recognized by a shape pattern matching of an image region surrounded by the edge point group, and the indicator image Img2 is generated with a size and a shape adjusted to the image region. Besides the semitransparent image, the indicator image Img2 may be an image having a combination of various shapes, sizes, and colors representing space occupying forms or position postures of the bucket 445 without spoiling visibility of the bucket 445 in the work environment image Img1, such as a line image representing a contour of the image region or an arrow-like image having one point on a contour line of the image region as a tip.

The indicator image Img2 at the second point in time t=t2 is superimposed on the work environment image Img1 at the third point in time t=t3 and output to the image output device 221 by the second output control element 242 (FIG. 4/STEP 212).

The third point in time t=t3 may be the same point in time as the second point in time t=t2. The third point in time t=t3 may be an intermediate point in time t=t1+(1−α)t2 (0<α<1) between the first point in time t=t1 and the second point in time t=t2. The third point in time t=t3 may be a point in time later than the first point in time t=t1 by a total time of a part of the first communication delay time TTD1, the first response delay time TRD1, the second communication delay time TTD2, and the second response delay time TRD2. For example, the third point in time t=t3 may be a point in time t=t1+β1·TTD1+β2·TRD1 later than the first point in time t=t1 by a weighted sum of the first communication delay time TTD1 and the first response delay time TRD1: β1·TTD1+β2·TRD1 (0≤β1≤1, 0≤β2≤1; excluding a case in which β1=β2=0). When β1=0 and β2=1, the third point in time t=t3 is a point in time t=t1+TRD1 later than the first point in time t=t1 by the first response delay time TRD1.

Figure 5:
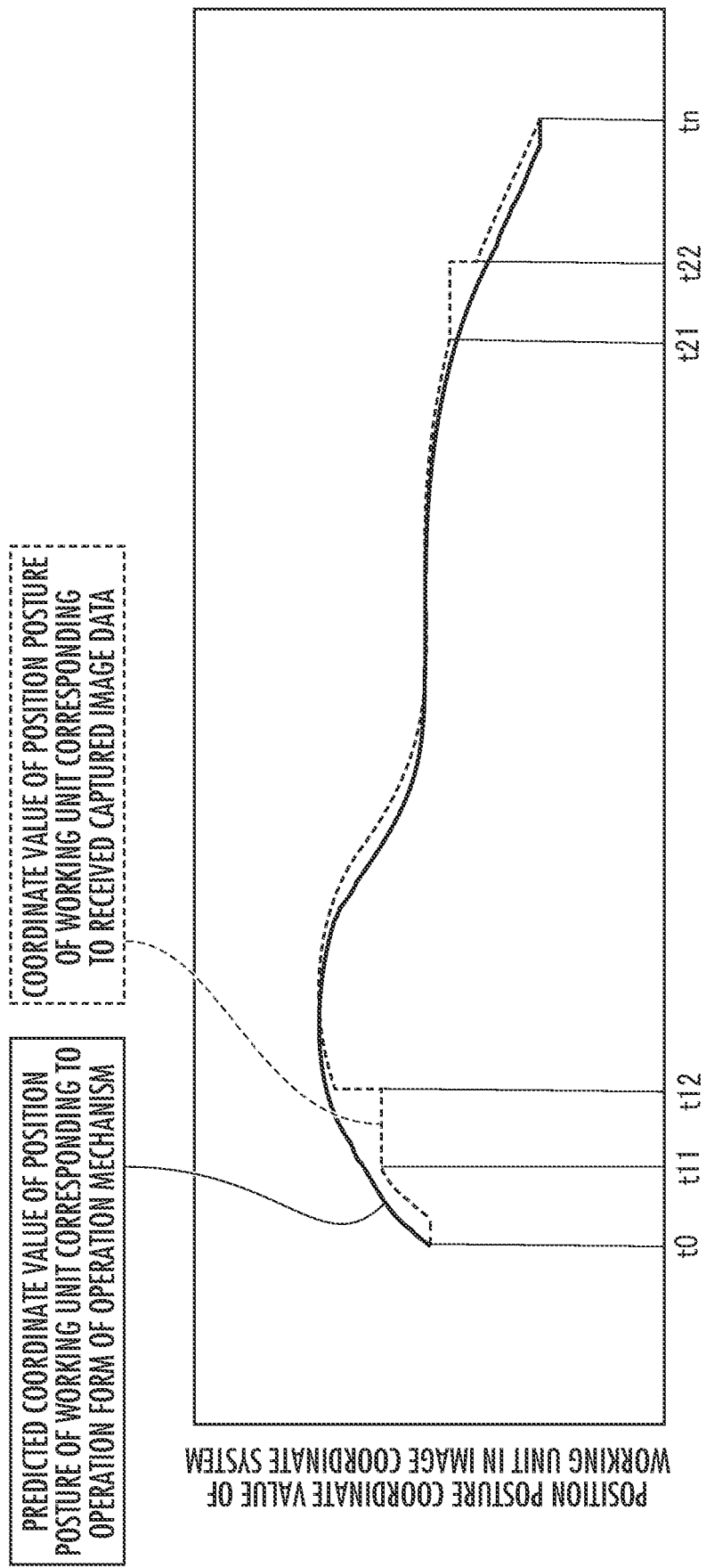
FIG. 5 is an explanatory diagram concerning a first example of an estimation method for a position posture of a working unit.

In FIG. 5, a change form of a coordinate value of a position posture (one or both of a position and a posture) of the working unit (the bucket 445) in a coordinate system of the work environment image Img1 output by the image output device 221 is conceptually shown. A broken line in FIG. 5 represents a change form of a coordinate value of a position posture of the working unit decided according to the received captured image data (see FIG. 4/C20). A solid line in FIG. 5 represents a change form of a coordinate value of a position posture of the working unit predicted according to an operation form of the remote operation mechanism 211.

A period from when operation of the remote operation mechanism 211 is started at a point in time t=t0 until when the operation of the remote operation mechanism 211 is stopped at a point in time t=tn is examined here. A position of the working unit in a work environment image system (u, v) is represented by a two-dimensional vector. A posture of the working unit is represented by a two-dimensional vector directed from a rear end portion (an attachment part to the arm 443) to a distal end portion.

As indicated by the solid line in FIG. 5, a position posture coordinate value of the working unit at any second point in time is predicted as indicated by the solid line according to an operation form of the remote operation mechanism 211 at a first point in time before the second point in time.

As indicated by the broken line in FIG. 5, in a period other than a period t=t11 to t12 and a period t=t21 to t22, a position posture coordinate value of the working unit decided according to captured image data and a position posture coordinate value of the working unit predicted according to an operation form of the remote operation mechanism 211 substantially coincide. In this case, for example, as shown in FIG. 8, a semitransparent indicator image Img2(τ1) simulating the bucket 445 is superimposed on a work environment image Img1(τ1) to substantially overlap an image region representing the bucket 445 and is output to the image output device 221.

Figure 9:
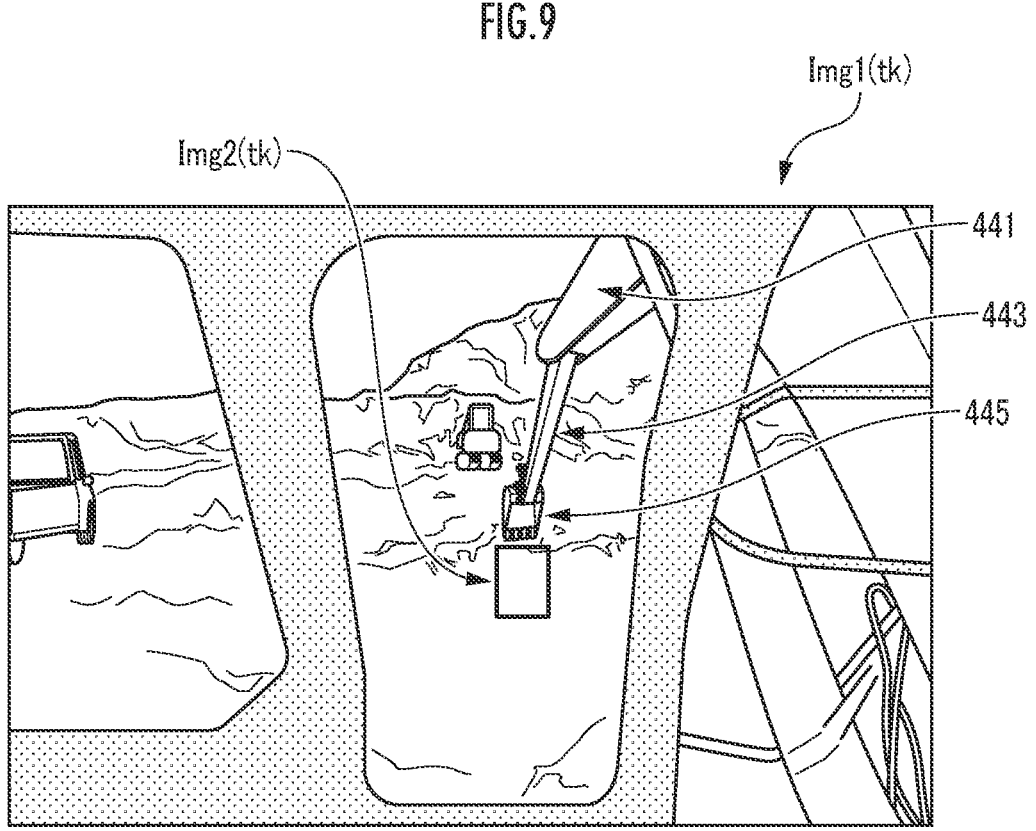
FIG. 9 is an explanatory diagram concerning a second output form of the indicator image.

On the other hand, before and after each of the period t=t11 to t12 and the period t=t21 to t22, because of a cause such as a communication failure between the remote operation device 20 and the working machine 40, a position posture coordinate value of the working unit corresponding to captured image data in a work environment image discontinuously changes and deviates from the position posture coordinate value of the working unit predicted according to the operation form of the remote operation mechanism 211. In this case, for example, as shown in FIG. 9, a semitransparent indicator image Img2(τ2) simulating the bucket 445 is superimposed on the work environment image Img1(τ2) in a position where the bucket 445 is predicted to be originally present, although deviating from an image region representing the bucket 445, and output to the image output device 221. A time interval of the first point in time and the second point in time may be set such that the first point in time is out of the period in an initial period of each of the period t=t11 to t12 and the period t=t21 to t22 but, thereafter, the first point in time is included in the period.

(Effects)

Figure 8:
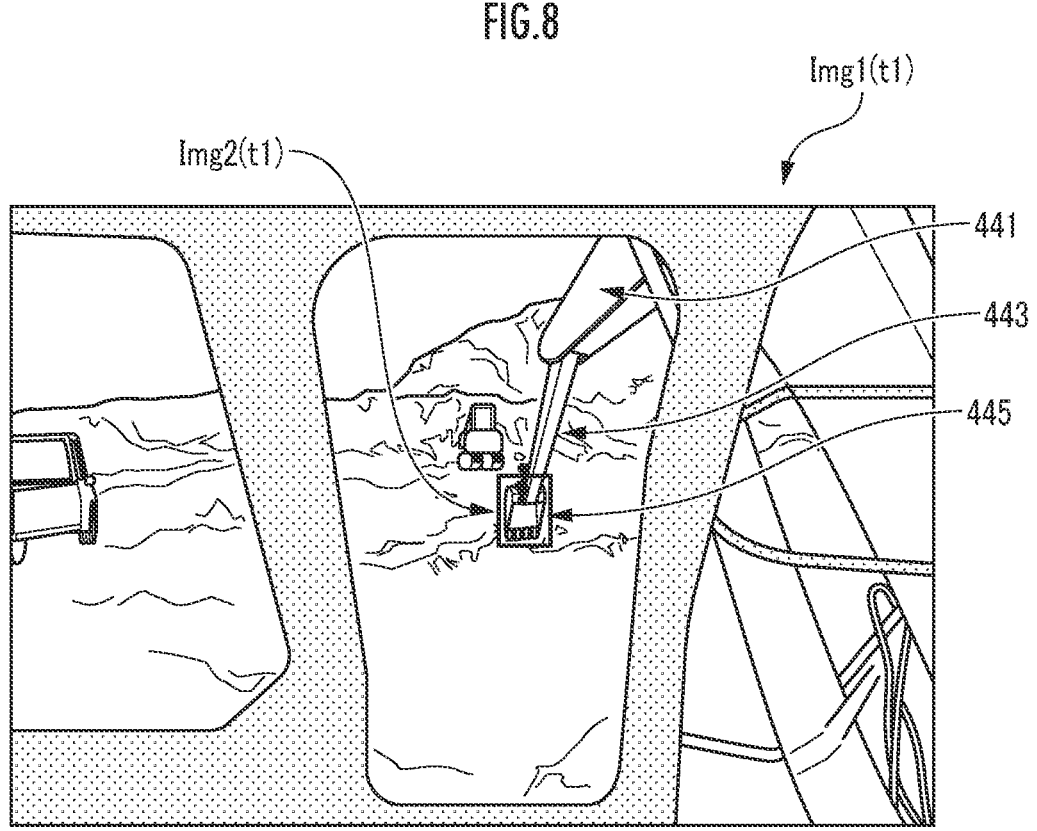
FIG. 8 is an explanatory diagram concerning a first output form of an indicator image.

With the remote operation system having the configuration explained above, the indicator image Img2 is generated in the remote operation device 20 and, then, the indicator image Img2 is superimposed on the work environment image Img1 and output to the image output device 221 (see FIG. 4/STEP 210 to STEP 212 and FIG. 8 and FIG. 9). Accordingly, a failure does not occur in transmission of the indicator image Img2 such as a line image.

In some case, because of a cause such as a communication failure between the remote operation device 20 and the working machine 40 due to a transmission delay of captured image data, a position posture coordinate value of the working unit corresponding to the captured image data in a work environment image discontinuously changes and deviates from a position posture coordinate value of the working unit predicted according to an operation form of the remote operation mechanism 211. In this case, the semitransparent indicator image Img2(τ2) simulating the bucket 445 is superimposed on the work environment image Img1(τ2) in a position where the bucket 445 is predicted to be originally present and deviating from an image region representing the bucket 445, and output to the image output device 221 (see FIG. 9).

Accordingly, deviation of the position of the indicator image Img2 of the bucket 445 in the work environment image Img1 with respect to the position of the bucket 445 (the working unit) in the real space is reduced or eliminated Other Embodiments of the Present Invention The remote control element 240 may recognize an operating form of the working mechanism (the turning mechanism 43 and the work attachment 44) detected through the state sensor 414 mounted on the working machine 40, transmitted from the real machine wireless communication equipment 422, and received by the remote wireless communication equipment 222. The second output control element 242 may predict a space occupying form of the working unit (the bucket 445) at a second point in time based on a deviation between an operation form of the remote operation mechanism 211 at a first point in time recognized by the remote control element 240 and the operating form of the working mechanism.

Figure 6:
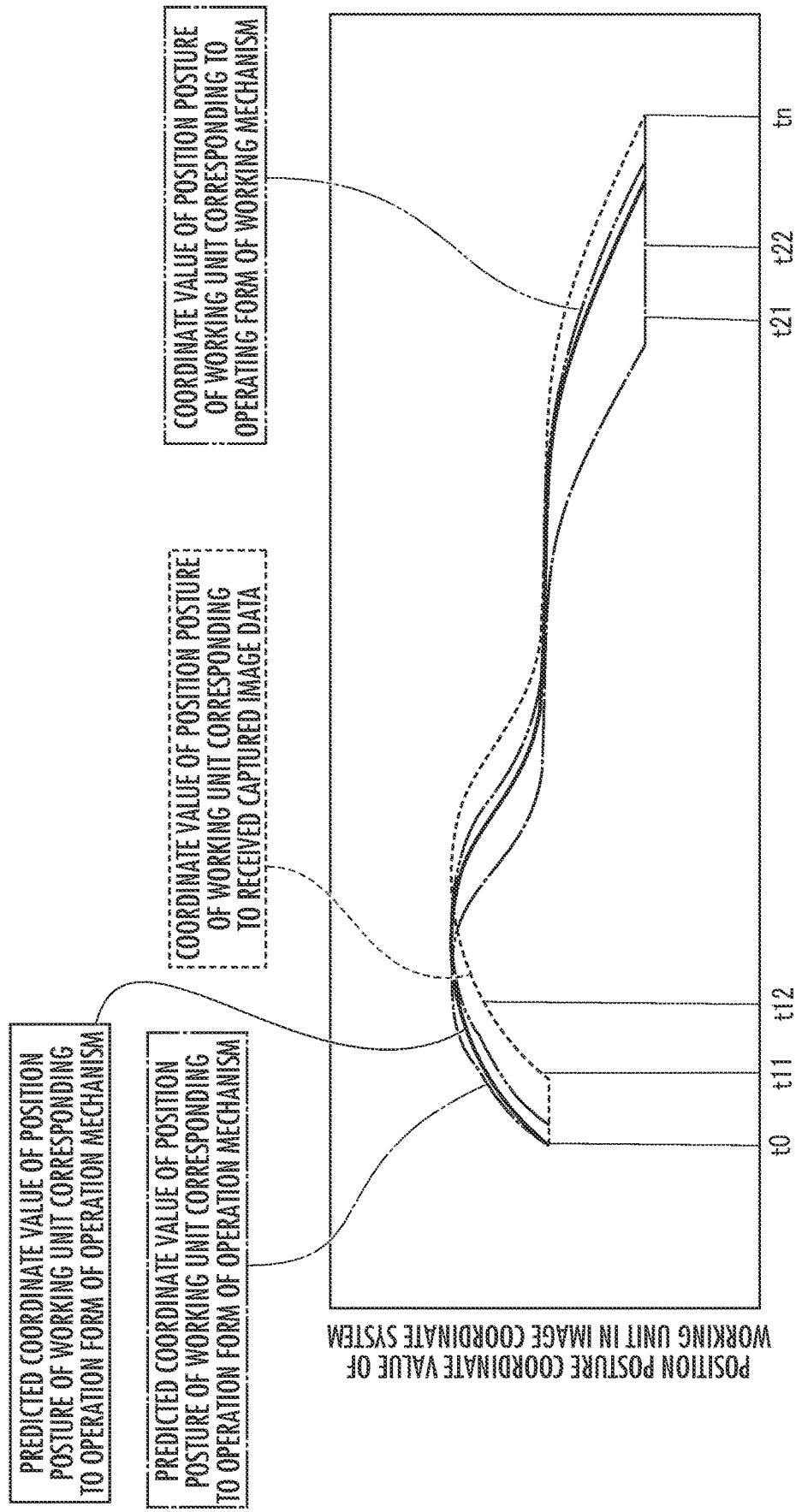
FIG. 6 is an explanatory diagram concerning a second example of the estimation method for the position posture of the working unit.

In FIG. 6, as in FIG. 5, a change form of a coordinate value of a position posture of the working unit (the bucket 445) in the coordinate system of the work environment image Img1 output by the image output device 221 is conceptually shown. A broken line in FIG. 6 represents a change form of a coordinate value of a position posture of the working unit decided according to the received captured image data (see FIG. 4/C20).

In some case, a response delay occurs from when the remote operation mechanism 211 (for example, the lever for turning) is operated until when the working mechanism (for example, the turning mechanism 43) operates according to the operation. In this case, for example, a coordinate value of a position posture of the working unit predicted according to an operation form of the remote operation mechanism 211 indicated by an alternate long and short dash line in FIG. 6 changes earlier than a coordinate value of a position posture of the working unit estimated according to an operating form of the working mechanism 44 indicated by an alternate long and two short dashes line in FIG. 6.

Therefore, for example, according to this response delay (a deviation between the operation form of the remote operation mechanism 211 and the operating form of the working mechanism 44), a time interval $\Delta t = t2 - t1$ between the first point in time $t=t1$ and the second point in time $t=t2$ is set. Consequently, a change form of a coordinate value of a position posture of the working unit indicated by a solid line in FIG. 6 substantially coinciding with, excluding a period in which the coordinate value discontinuously changes, the change form of the coordinate value of the position posture of the working unit decided according to the captured image data indicated by a broken line in FIG. 6 is predicted. Accordingly, influence due to the response delay is reduced and the deviation of the position of the indicator image Img2 of the bucket 445 in the work environment image Img1 with respect to the position of the bucket 445 (the working unit) in the real space is further reduced or eliminated.

When a stop of first designated operation (for example, turning operation through the lever for turning) is recognized by the remote control element 240 as an operation form of the remote operation mechanism 211, the second output control element 242 may stop an output of the indicator image Img2 in the image output device 221 simultaneously with the stop or after a fixed time (for example, a response delay time). Consequently, although the first designated operation is stopped, deterioration in visibility of the working unit in the work environment image Img1 output to the image output device 221 is avoided by remaining of the indicator image Img2 displaced according to the first designated operation.

When a start of second designated operation is recognized by the remote control element 240 as an operation form of the remote operation mechanism 211, the second output control element 242 may cause the image output device 221 to temporarily output the indicator image Img2. Consequently, the indicator image Img2 displaced according to the second designated operation is superimposed on the work environment image Img1 and output to the image output device 221 for a fixed time after the second designated operation is started. The second designated operation may be operation of the same type as the first designated operation or may be operation of a different type. Information necessary for the operator is to know whether the working machine 40 is reacting to an operation input of the remote operation mechanism 211. Therefore, the indicator image Img2 is output to the image output device 221 for the fixed time from the operation start, whereby it is possible to achieve improvement of remote operation efficiency by the operator while reducing a prediction operation load for a space occupying form of the bucket 445 after the first point in time t=t1 before the second point in time t=t2, which is a cycle of the fixed period.

REFERENCE SIGNS LIST 10 remote operation server
20 remote operation device
24 remote control device
40 working machine
210 remote input interface
211 remote operation mechanism
220 remote output interface
221 image output device
222 remote wireless communication equipment
240 remote control element
241 first output control element
242 second output control element
410 real machine input interface
412 real machine imaging device
414 state sensor group
420 real machine output interface
440 work attachment (working mechanism)
445 bucket (working unit)
Img1 work environment image
Img2 indicator image.

The invention claimed is:

1. A remote operation device for remotely operating a working machine including a working mechanism, wherein the remote operation device is configured to wirelessly communicate with the working machine and the working machine is configured to wirelessly communicate with the remote operation device, the remote operation device comprising:
a remote image output device;
a remote operation mechanism;
a remote control element that recognizes an operation form of the remote operation mechanism by an operator and causes the remote operation device to transmit a command signal corresponding to the operation form to the working machine;
a first output control element that causes the remote image output device to output a work environment image including a working unit of the working mechanism acquired through an imaging device mounted on the working machine, transmitted from the working machine, and received by the remote operation device; and
a second output control element that estimates, based on an operation form of the remote operation mechanism at a first point in time recognized by the remote control element, a space occupying form of the working unit at a second point in time later than the first point in time, superimposes, on the work environment image, at a third point in time included in a period from the first point in time to the second point in time, an indicator image representing the estimated space occupying form and/or a position posture of the working unit at the second point in time, and causes the remote image output device to output the indicator image, wherein the indicator image comprises one or more of the following features: (a) the indicator image is a semi-transparent image covering a portion of the work environment image equivalent in size to the working unit on the work environment image, (b) the indicator image includes a combination of shapes of various sizes and/or colors representing the working unit on the work environment image, (c) the indicator image includes one or more line images representing a contour of the working unit on the work environment image, and/or (d) the indicator image includes one or more arrow images representing a contour of the working unit on the work environment image with at least one point on a contour line of the working unit as a tip of a first arrow image.

2. The remote operation device according to claim 1, wherein the second output control element superimposes the indicator image on the work environment image at the third point in time, which is an intermediate point in time between the first point in time and the second point in time, and causes the remote image output device to output the indicator image.

3. The remote operation device according to claim 2, wherein
the second output control element estimates the space occupying form of the working unit with a point in time later than the first point in time by a total delay time set as the second point in time, the total delay time being a total of
a first delay time, which is at least one of a first communication delay time, which is a communication delay time from when a command signal corresponding to an operation form of the remote operation mechanism is transmitted from the remote operation device until when the command signal is received by the working machine, and a first response delay time, which is a response delay time from when the command signal is received by the real machine wireless communication equipment until when operation of the working machine is controlled according to the command signal, and
a second delay time, which is at least one of a second communication delay time, which is a communication delay time from when the work environment image is transmitted from the working machine until when the work environment image is received by the remote operation device, and a second response delay time, which is a response delay time from when the work environment image is received by the remote operation device until when the work environment image is output to the remote image output device, and
the second output control element superimposes the indicator image on the work environment image at the third point in time, which is a point in time later than the first point in time by the first delay time, and causes the remote image output device to output the indicator image.

4. The remote operation device according to claim 3, wherein the second output control element superimposes the indicator image on the work environment image at the third point in time, which is a point in time later than the first point in time by the first response delay time serving as the first delay time, and causes the remote image output device to output the indicator image.

5. The remote operation device according to claim 1, wherein the second output control element superimposes the indicator image on the work environment image at the third point in time, which is a same point in time as the second point in time, and causes the remote image output device to output the indicator image.

6. The remote operation device according to claim 5, wherein the second output control element estimates the space occupying form of the working unit with a point in time later than the first point in time by a total delay time set as the second point in time, the total delay time being a total of
- a first delay time, which is at least one of a first communication delay time, which is a communication delay time from when a command signal corresponding to an operation form of the remote operation mechanism is transmitted from the remote operation device until when the command signal is received by the working machine, and a first response delay time, which is a response delay time from when the command signal is received by the working machine until when operation of the working machine is controlled according to the command signal, and
- a second delay time, which is at least one of a second communication delay time, which is a communication delay time from when the work environment image is transmitted from the working machine until when the work environment image is received by the remote operation device, and a second response delay time, which is a response delay time from when the work environment image is received by the remote operation device until when the work environment image is output to the remote image output device.

7. The remote operation device according to claim 1, wherein
- the remote control element recognizes an operating form of the working mechanism detected through a state sensor mounted on the working machine, transmitted from the working machine, and received by the remote operation device, and
- the second output control element estimates a space occupying form of the working unit at the second point in time based on a deviation between an operation form of the remote operation mechanism at the first point in time recognized by the remote control element and an operating form of the working mechanism.

8. The remote operation device according to claim 1, wherein, when a stop of first designated operation is recognized as an operation form of the remote operation mechanism by the remote control element, the second output control element stops an output of the indicator image in the remote image output device.

9. The remote operation device according to claim 1, wherein, when a start of second designated operation is recognized as an operation form of the remote operation mechanism by the remote control element, the second output control element causes the remote image output device to temporarily output the indicator image.

10. A remote operation system comprising:
a working machine including a working mechanism; and
a remote operation device for remotely operating the working machine, wherein the remote operation device is configured to wirelessly communicate with the working machine and the working machine is configured to wirelessly communicate with the remote operation device, the remote operation device comprising:
a remote image output device;
a remote operation mechanism;
a remote control element that recognizes an operation form of the remote operation mechanism by an operator and causes the remote operation device to transmit a command signal corresponding to the operation form to the working machine;
a first output control element that causes the remote image output device to output a work environment image including a working unit of the working mechanism acquired through an imaging device mounted on the working machine, transmitted from the working machine, and received by the remote operation device; and
a second output control element that estimates, based on an operation form of the remote operation mechanism at a first point in time recognized by the remote control element, a space occupying form of the working unit at a second point in time later than the first point in time, superimposes, on the work environment image, at a third point in time included in a period from the first point in time to the second point in time, an indicator image representing the estimated space occupying form and/or a position posture of the working unit at the second point in time, and causes the remote image output device to output the indicator image, wherein the indicator image comprises one or more of the following features: (a) the indicator image is a semitransparent image covering a portion of the work environment image equivalent in size to the working unit on the work environment image, (b) the indicator image includes a combination of shapes of various sizes and/or colors representing the working unit on the work environment image, (c) the indicator image includes one or more line images representing a contour of the working unit on the work environment image, and/or (d) the indicator image includes one or more arrow images representing a contour of the working unit on the work environment image with at least one point on a contour line of the working unit as a tip of a first arrow image.

* * * * *